United States Patent [19]

Light et al.

[11] Patent Number: 4,683,999

[45] Date of Patent: Aug. 4, 1987

[54] FLUID COUPLING DEVICE INCLUDING MANUAL ENGAGEMENT MEANS

[75] Inventors: Gerard M. Light, Marshall; LeRoy E. Rocco; Stephen M. Clancey, both of Battle Creek, all of Mich.

[73] Assignee: Eaton Corporation, Cleveland, Ohio

[21] Appl. No.: 825,507

[22] Filed: Feb. 3, 1986

[51] Int. Cl.$^4$ ................... F16D 35/00; F16D 11/00
[52] U.S. Cl. ................... 192/58 B; 192/82 T; 192/114 R
[58] Field of Search ............ 192/58 B, 58 A, 58 R, 192/114, 82 T

[56] References Cited

U.S. PATENT DOCUMENTS

| | | | |
|---|---|---|---|
| 2,497,893 | 2/1950 | Linhan | 192/114 X |
| 3,011,607 | 12/1961 | Englander . | |
| 3,174,600 | 3/1965 | Oldberg | 192/82 T |
| 3,191,733 | 6/1965 | Weir . | |
| 3,209,993 | 10/1965 | Seifert . | |
| 4,188,785 | 2/1980 | Ando et al. . | |
| 4,320,723 | 3/1982 | Wendling et al. . | |
| 4,544,054 | 10/1985 | Brown | 192/58 B |

*Primary Examiner*—William F. Pate, III
*Assistant Examiner*—R. Chilcot
*Attorney, Agent, or Firm*—D. A. Rowe; L. J. Kasper

[57] ABSTRACT

A fluid coupling device is disclosed of the type including an input coupling member (11) rotatably disposed within an output coupling assembly (13). A portion of the output coupling assembly comprises a cover member (17) which cooperates with a housing member (15) to define an operating chamber (31). A valve plate (29) separates the operating chamber (31) from a fluid reservoir chamber (33) and defines a fill opening (41) to permit fluid flow from the reservoir chamber into the operating chamber. In a primary embodiment, the cover member (17) defines a radial passage (79) which is disposed to communicate fluid from the reservoir chamber (33) to the operating chamber (31). Such flow through the radial passage (79) may be controlled by a manual control member (65) which may be disposed in either a normal operation position, blocking flow through the passage (79), or may be rotated to a fluid engaged position in which fluid flows through the passage (79) and into the operating chamber (31), independent of the temperature condition being sensed by a temperature-responsive bimetal coil (43).

11 Claims, 8 Drawing Figures

FLUID COUPLING DEVICE INCLUDING MANUAL ENGAGEMENT MEANS

BACKGROUND OF THE DISCLOSURE

The present invention relates to fluid coupling devices of the type which transmit torque from an input coupling member to an output coupling member by means of a viscous fluid.

Although the present invention may be used advantageously in fluid coupling devices having many different configurations and applications, it is especially advantageous in a coupling device of the type used to drive a radiator cooling fan of an internal combustion engine, and will be described in connection therewith.

Conventionally, fluid cooling devices include an output coupling member defining a fluid chamber, a partition separating the fluid chamber into a fluid reservoir chamber and a fluid operating chamber, and an input coupling member rotatably disposed within the operating chamber. When the operating chamber is substantially filled with viscous fluid, rotation of the input coupling member transmits torque to the output coupling member by means of viscous shear (engaged mode). When operation in the engaged mode is not required (e.g., when engine cooling is not required), a valve member covers the fill opening, and fluid is pumped out of the operating chamber back into the reservoir chamber such that the coupling device operates in the disengaged mode.

For many years, those skilled in the art have recognized the desirability of being able to manually engage a viscous fan drive in the event the vehicle overheats. Also, if there is a malfunction in the cooling system, it is desirable to be able to manually engage the fan drive for diagnostic purposes, to try to determine the actual source of the malfunction, rather than replacing a component such as the viscous fan drive, and then determining subsequently that the fan drive was not defective in any way.

Despite the recognized need for manual engagement capability for viscous fan drives, the prior art has, prior to the present invention, provided only devices of the type shown in U.S. Pat. No. 4,320,723. The device in the cited patent achieves manual engagement by mechanically locking the housing of the fan drive to the input shaft. As will be understood by those skilled in the art, the result of the arrangement in the cited patent is that the fan will be driven at the speed of the input shaft, whereas during normal operation (torque transmission by viscous shear), the fan speed is limited to some predetermined, maximum speed by the inherent, limited torque-transmitting capability of the viscous fluid. It is important to note that viscous fan drives and radiator cooling fans are designed and sized based upon the assumption that the fan and fan drive will never operate above the predetermined, maximum speed which can be achieved as a result of the viscous shear. If such a fan drive has its output mechanically locked to the input shaft, the result is substantially greater torque loading on the fan, which can damage the fan blades as well as the spider, and substantially greater torque loading on the fan drive which can damage the bearings, the shaft-clutch connection, etc. The concern over such damage is even greater in the case of crank-mounted fan drives wherein a substantial amount of torsional vibration is transmitted to the input shaft of the fan drive. When such a crank-mounted fan drive is transmitting torque by means of viscous shear, the viscous fluid effectively damps much of the torsional vibration. However, if such a fan drive has its output mechanically locked to the input shaft, as has been taught by the prior art, the torsional vibration is transmitted to the housing of the fan drive and to the radiator cooling fan.

SUMMARY OF THE INVENTION

Accordingly, it is an object of the present invention to provide a fluid coupling device which may be manually engaged by the operator if so desired, in case of a vehicle overheat or a cooling system malfunction, wherein such manual engagement results in the output of the coupling device being driven at the same speed it would be driven during normal operation, and not at the same speed as the input shaft.

It is a further object of the present invention to provide a fluid coupling device which achieves the above-stated object by means of a manually selectable fluid engagement of the coupling device, wherein the coupling device is insured of operating in the engaged mode.

It is a further object of the present invention to provide a fluid coupling device which achieves both of the above-stated objects and, in addition, has the capability of a mechanical engagement of the output to the input for situations in which such engagement is the only way to achieve cooling fan operation.

The above and other objects of the invention are accomplished by the provision of a fluid coupling device of the type including a first rotatable coupling assembly comprising a housing member and a cover member cooperating to define a fluid chamber therebetween. A means is associated with the first coupling assembly and is disposed to separate the fluid chamber into a fluid operating chamber and a fluid reservoir chamber. A second rotatable coupling member is disposed in the operating chamber and is rotatable relative to the first coupling assembly. The first coupling assembly and the second coupling member are operable to transmit torque therebetween in response to the presence of fluid in the operating chamber. Fluid passage means is disposed to communicate fluid between the operating chamber and the reservoir chamber, and a primary control means is operable to control the flow of fluid in the fluid passage means to provide operation of the fluid coupling device in either an engaged mode or a disengaged mode, in response to changes in a predetermined condition.

The fluid coupling device of the invention is characterized by a manually operable control means operably associated with either the fluid passage means or the primary control means and including a control member. The control member is selectively movable between:

(i) a first position in which flow through the fluid passage means is controlled solely by the primary control means to provide normal operation of the fluid coupling device in either the engaged mode or the disengaged mode, as determined by the predetermined condition; and (ii) a second position insuring a net flow of fluid in the fluid passage means from the fluid reservoir chamber to the fluid operating chamber to provide operation of the coupling device in the engaged mode, regardless of the status of the predetermined condition, and independent of the operation of the primary control means.

DESCRIPTION OF THE PREFERRED EMBODIMENTS

Figure 1:
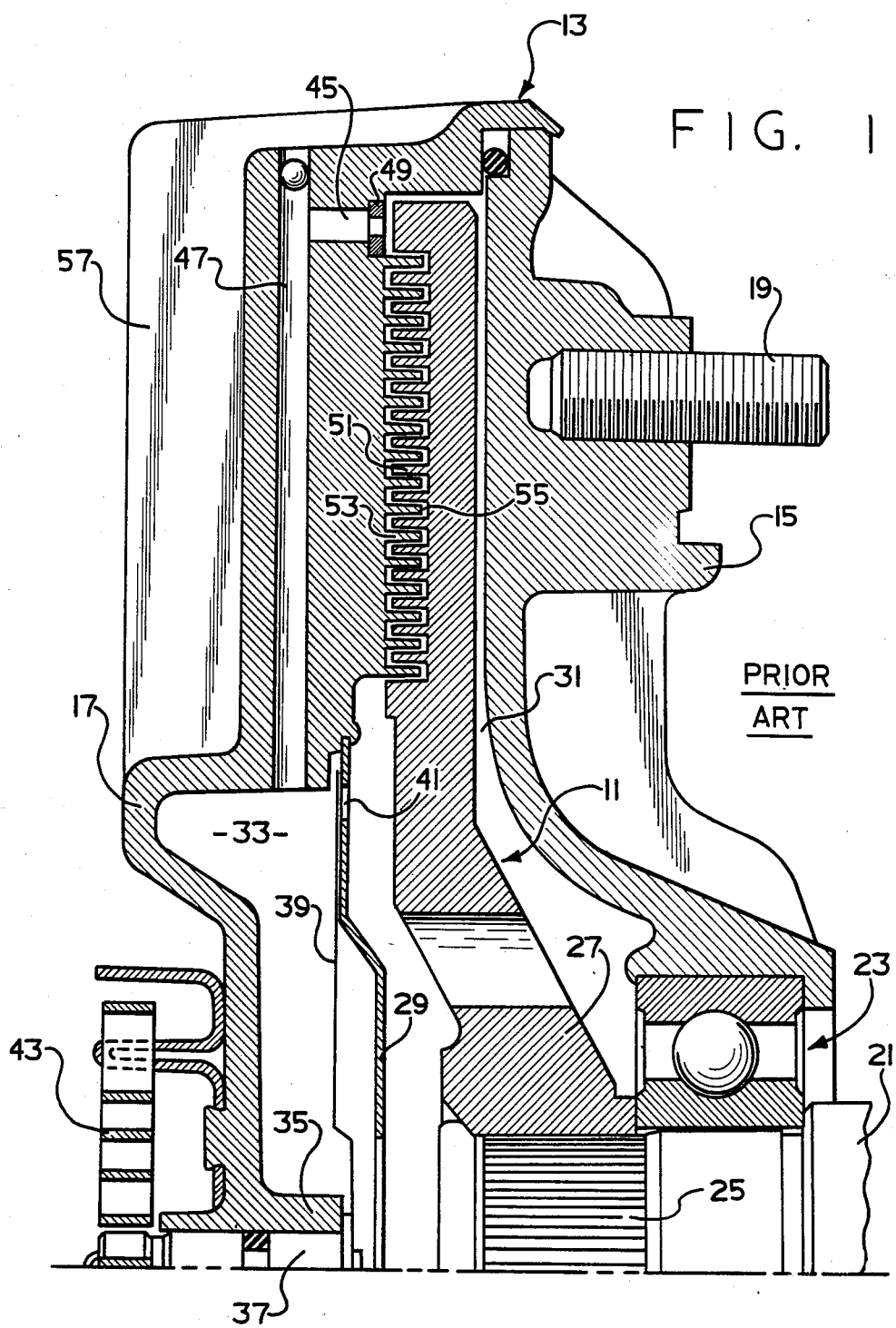
FIG. 1 is an axial cross-section of the upper half of a viscous fan drive of the type with which the present invention may be utilized.

Referring now to the drawings, which are not intended to limit the invention, FIG. 1 illustrates a typical viscous fan drive (fluid coupling device) with which the present invention may be utilized. It will be understood by those skilled in the art that the illustration in FIG. 1 is by way of example only, and the present invention is not limited to any particular configuration of fluid coupling device, or use thereof, except as specifically noted hereinafter.

The fluid coupling device includes an input coupling member generally designated 11, and an output coupling assembly, generally designated 13. The output coupling assembly 13 includes a housing member 15 and a cover member 17, the members 15 and 17 being secured together by a rollover of the outer periphery of the cover member 17 as is well known in the art. The fluid coupling is adapted to have a radiator cooling fan attached to the housing member 15 by means of a plurality of threaded members 19.

The fluid coupling device includes an input shaft 21 on which the input coupling member 11 is mounted. The input shaft 21 is rotatably driven, typically by being attached to the engine water pump. The input shaft 21 functions as a support for the inner race of a bearing set 23, which is seated on the inside diameter of the housing member 15. The forward end (left end in FIG. 1) of the input shaft 21 has an interference fit between a serrated portion 25 and an opening defined by a hub portion 27 of the input coupling member 11. As a result, rotation of the input shaft 21 causes a rotation of the input coupling member 11.

The housing member 15 and the cover member 17 cooperate to define a fluid chamber which is separated, by means of a circular valve plate 29, into a fluid operating chamber (working chamber) 31, and a fluid reservoir chamber 33. Thus, it may be seen in FIG. 1 that the input coupling member 11 is disposed within the fluid operating chamber 31.

The cover member 17 defines a generally cylindrical shaft support portion 35, and rotatably disposed within the portion 35 is a valve shaft 37 extending outwardly (to the left in FIG. 1) through the cover member 17. Attached to the inner end (right end in FIG. 1) of the valve shaft 37 is a valve arm 39, the general construction of which forms no part of the present invention, but which may be better understood by reference to U.S. Pat. No. 3,055,473, assigned to the assignee of the present invention and incorporated herein by reference. Movement of the valve arm controls the flow of fluid from the reservoir chamber 33 to the operating chamber 31, through a fill opening 41 formed in the valve plate 29.

Operatively associated with the outer end of the valve shaft 37 is a temperature-responsive bimetal coil 43. The manner in which the bimetal coil 43 operates to control the movement of the valve arm 39, in response to variations in a predetermined temperature condition, is well known in the art, is not an essential feature of the present invention, and will not be described further herein.

The cover member 17 defines an axial passage 45 in communication with the fluid operating chamber 31, and a radial passage 47 which provides fluid communication from the axial passage 45 to the reservoir chamber 33. Disposed adjacent the passage 45 is a pumping element (wiper) 49 which is operable to engage the relatively rotating fluid in the chamber 31, generating a localized region of relatively higher fluid pressure, to pump continually a small quantity of fluid back into the reservoir chamber 33, through the passages 45 and 47, as is also well known in the art.

The input coupling member 11 includes a forward surface which defines a plurality of annular lands 51. The adjacent surface of the cover member 17 forms a plurality of annular lands 53, and the lands 51 and 53 are interdigitated to define a serpentine-shaped viscous shear space 55 therebetween. Torque is transmitted from the input coupling member 11 to the output coupling assembly 13, by a shearing of the viscous fluid contained in the shear space 55. This shearing of the viscous fluid results in generation of a substantial amount of heat which must be dissipated primarily by the cover member 17 which includes a plurality of cooling fins 57.

OPERATION

As is well known to those skilled in the art, a fluid coupling device of the type disclosed herein can operate in either an "engaged" or a "disengaged" mode depending upon the current status of some predetermined condition. In the subject embodiment, with the coupling device being used to drive a radiator cooling fan, if the ambient air temperature is below a predetermined temperature, the bimetal coil 43 moves the valve arm 39 to a position covering the fill opening 41. The result is that fluid communication from the reservoir chamber 33 to the operating chamber 31 is blocked, and the operation of the pumping element 49 causes most of the fluid in the operating chamber 31 to be pumped back into the reservoir chamber 33 in the manner previously described. This constitutes the "disengaged" mode of operation. As an example, if the input shaft 21 and input coupling member 11 were rotating at approximately 2,500 rpm, the speed of rotation of the output coupling assembly 13 in the disengaged mode might be somewhere in the range of 800 to 1,000 rpm.

If the ambient temperature adjacent the coupling device rises above the predetermined temperature condition, the bimetal coil 43 moves the valve arm 39 to a position uncovering the fill opening 41, thus permitting communication of fluid from the reservoir chamber 33 into the operating chamber 31. Although there is still a discharge flow from the operating chamber back to the reservoir chamber caused by the pumping element 49, the "net flow" is from the reservoir chamber into the operating chamber such that the shear space 55 becomes substantially filled with the viscous fluid. This constitutes the "engaged" mode of operation. As an example, with an input speed of approximately 2,500 rpm, if the coupling device is in the engaged mode, the speed of rotation (output speed) of the coupling assembly 13 may be approximately 2,200 rpm.

It will be understood by those skilled in the art that the fill opening 41 and the axial passage 45 and radial passage 47 together comprise "fluid passage means" which function to communicate fluid between the operating chamber 31 and the reservoir chamber 33. In addition, it will be understood that the pumping element 49, and the valve arm 39, valve shaft 37 and bimetal coil 43 together comprise the "primary control means" for the fluid coupling device, controlling the flow of fluid in the "fluid passage means". Finally, it is important to understand that, for purposes of the present invention, the engaged and disengaged modes described above constitute the "normal operation" of the fluid coupling device. In other words, the "normal operation" occurs when the coupling device is in either the engaged or the disengaged mode, as determined by the current status of the predetermined temperature condition, which in turn, controls the level of fluid fill in the operating chamber 31 by means of the "primary control means".

FIGS. 2-6

Figure 2:
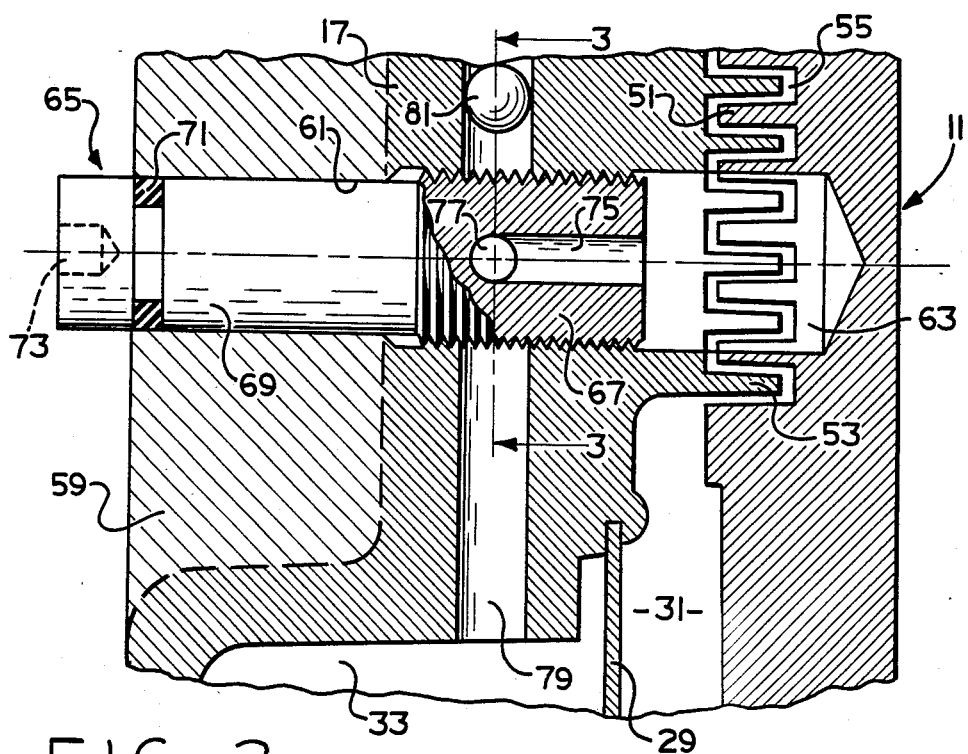
FIG. 2 is an enlarged, fragmentary cross-section, similar to FIG. 1, but taken on a different plane, illustrating the present invention in its normal operating position.
Figure 3:
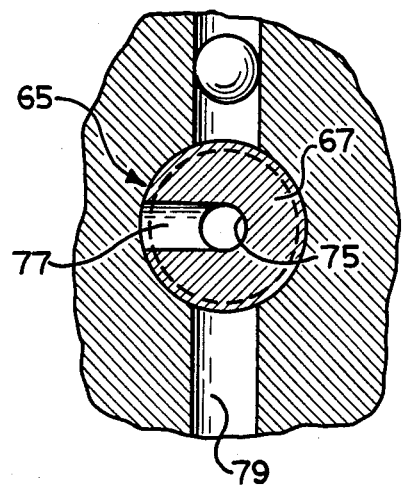
FIG. 3 is a transverse cross-section taken on line 3—3 of FIG. 2, and on the same scale.

Referring now primarily to FIGS. 2 and 3, the present invention will be described in detail. It should first be noted that FIG. 2 (as well as FIGS. 4 and 6) is a section taken on a different plane than the view in FIG. 1. FIG. 2 is taken through a section at which the cover member 17 defines a boss portion 59 which, in the subject embodiment, extends forwardly (to the left in FIG. 2) about the same distance as the cooling fins 57. The boss portion 59 and the main portion of the cover member 17 together define a stepped bore 61. Disposed adjacent the right end of the stepped bore 61 is a recess 63 defined by the input coupling member 11. It should be understood that during operation of the coupling device, the recess 63 is circumferentially aligned with the stepped bore 61, as shown in FIG. 2, only once during each rotation of the coupling member 11 relative to the cover member 17.

Disposed within the bore 61 is a manually operable control member, generally designated 65, the control member 65 including a threaded portion 67 and a cylindrical portion 69. Disposed about the cylindrical portion 69, and in sealing engagement with the bore 61 is a sealing ring 71. The cylindrical portion 69 also defines an opening 73 which may be configured for the insertion of a tool such as a hex-shaped Allen wrench, to facilitate manual rotation of the control member 65 by the vehicle operator, or by a mechanic or test technician, for reasons which will be described in greater detail subsequently.

The threaded portion 67 of the control member 65 defines an axially-extending passage 75 and a transverse passage 77. The cover member 17 defines a radial passage 79 which may be generally similar to the radial passage 47 shown in FIG. 1. The radial passage 79 intersects the stepped bore 61, and may be sealed at a location radially outward from the bore 61 by means of a pressed-in ball 81. The general function of the radial passage 79 is to provide a secondary fluid passage by means of which fluid may be communicated from the reservoir chamber 33 to the operating chamber 31 as will be described in greater detail subsequently.

FIGS. 2 and 3 illustrate the "normal operation" of the fluid coupling device in which the control member 65 is rotated to the position shown such that the transverse passage 77 is blocked from fluid communication with the radial passage 79. In this position, no fluid can flow from the operating chamber 33 through the radial passage 79, and into the shear space 55. Therefore, the coupling device operates in either the engaged mode or the disengaged mode, as determined solely by the "primary control means" and the manner in which it controls the flow of fluid through the "fluid passage means" in response to the predetermined temperature condition.

Figure 4:
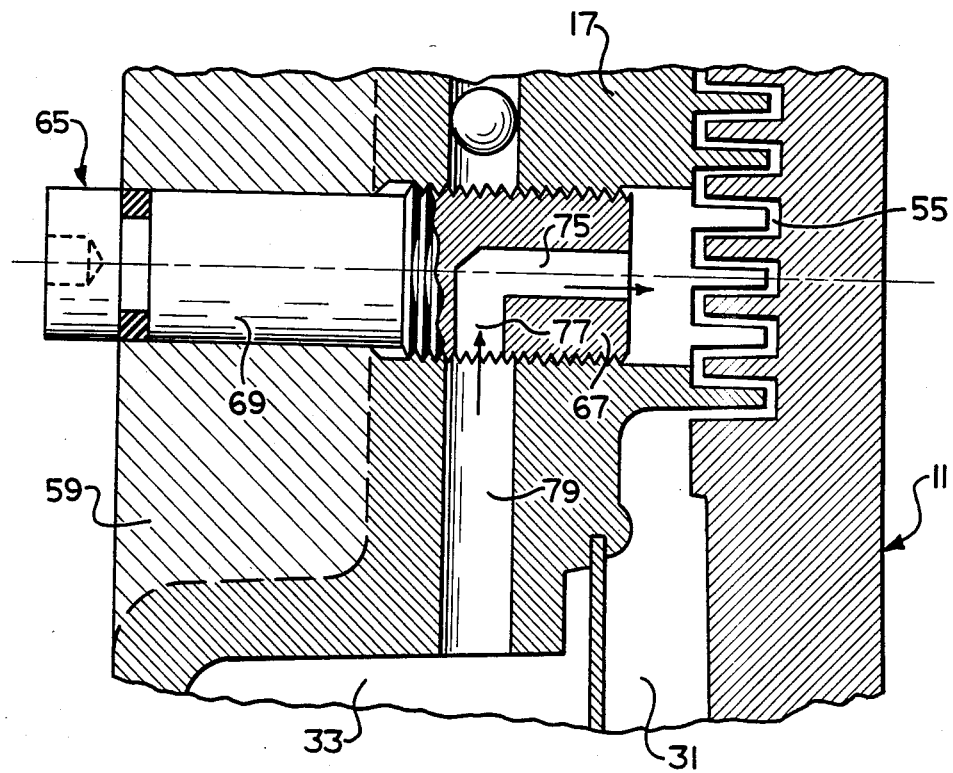
FIG. 4 is an enlarged, fragmentary cross-section, similar to FIG. 2, illustrating the present invention in the "fluid engaged" position.

Referring now to FIG. 4, the "fluid engaged" position will be described. In the event of a vehicle overheat, or any of the other situations described in the background of this specification, it may be desirable to be sure that the coupling device is operating in the engaged mode, and that it is producing the maximum speed attainable by means of viscous shear. In order to do this, the control member 65 may be rotated to the position shown in FIG. 4, in which the transverse passage 77 is aligned with, and in fluid communication with the radial passage 79, such that there will be a continual flow of fluid from the reservoir chamber 33 radially outward through the radial passage 79, then through the transverse passage 77 and axial passage 75. Fluid leaving the passage 75 flows through the adjacent portion of the bore 61 and into the shear space 55. It should be apparent that it will be necessary to provide some sort of marking on the head of the control member 65 to indicate the orientation of the transverse passage 77, in order to know when looking at the front of the coupling device whether the control member 65 is in the normal operation position or in the fluid engaged position.

Figure 5:
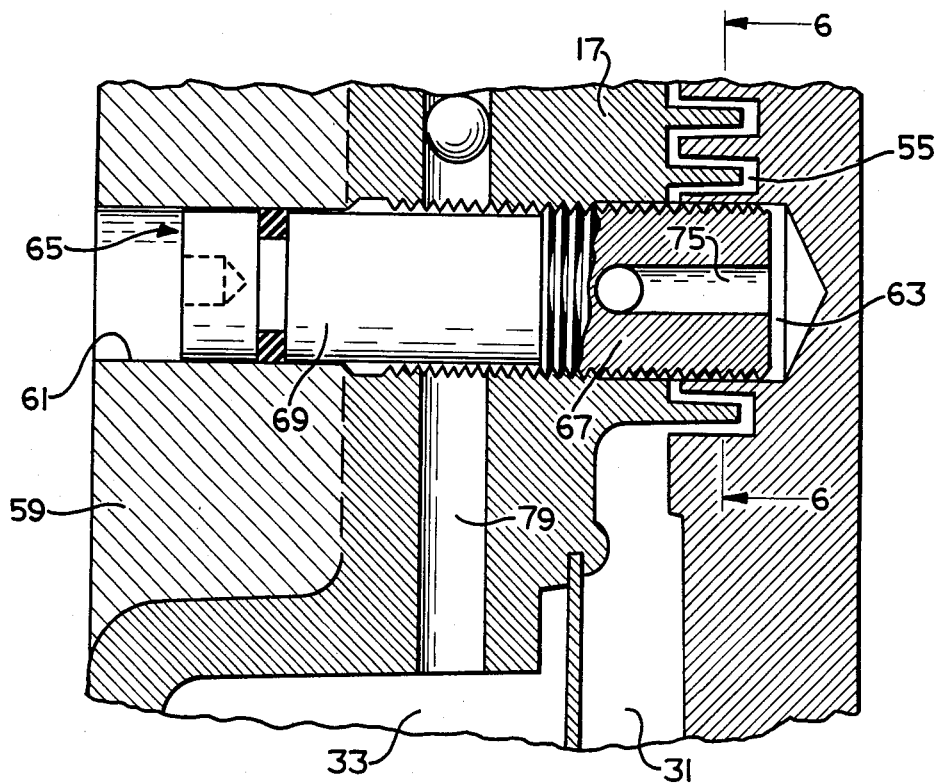
FIG. 5 is an enlarged, fragmentary cross-section, similar to FIGS. 2 and 4, illustrating the present invention in the "mechanically engaged" position.
Figure 6:
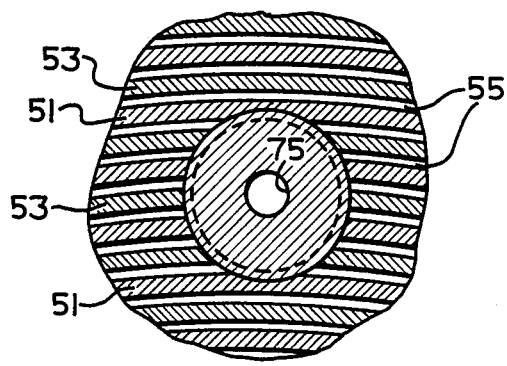
FIG. 6 is a transverse cross-section, taken on line 6—6 of FIG. 5, and on the same scale.

Referring now to FIGS. 5 and 6, the "mechanically engaged" position will be described. In the event that the fluid had leaked out of the coupling device, resulting in operation of the cooling fan at an insufficient speed, and overheating of the engine, the vehicle operator would have first attempted to achieve the engaged mode of operation by manually turning the control member 65 to the fluid engaged position shown in FIG. 4. However, because of the fluid leakage, there would still be insufficient fan speed to cool the engine and avoid damage to the engine. When it would become apparent to the operator that there was still an overheat condition, the operator could, as a last resort, move the control member 65 to the "mechanically engaged" position illustrated in FIGS. 5 and 6. This position is achieved by threading the control member 65 inwardly (to the right in FIG. 5) until the threaded portion 67 engages the lands 51 of the input coupling assembly 13 relative to the input coupling member 11 until the bore 61 is circumferentially aligned with the recess 63. Once such alignment has occurred, the control member 65 may be fitted further inwardly to the position shown in FIG. 5 in which the threaded portion 67 is disposed within the recess 63. With the control member 65 in the position shown in FIGS. 5 and 6, the coupling device is now mechanically engaged, i.e., the output of the coupling is in engagement with or locked to the input, such that the cooling fan is driven at the same speed as the input shaft 21. Although there are certain disadvantages to operating in the mechanically engaged mode, as discussed in the background of the specification, there are circumstances when it is more desirable to operate in the mechanically engaged mode, and perhaps damage the fan or fan drive, than to continue driving the vehicle in an overheat condition and perhaps burn up the engine. Therefore, it is an important aspect of the present invention to provide a manually operable control means which may be selectively utilized in the fluid engaged position, in an effort to achieve the engaged mode of operation of the coupling device, or, as a last resort, may be utilized in the mechanically engaged position.

It is also an important aspect of the invention that, after operation in either the fluid engaged position or the mechanically engaged position, the control member 65 can subsequently be returned to the normal operation position shown in FIG. 2.

FIG. 7

Figure 7:
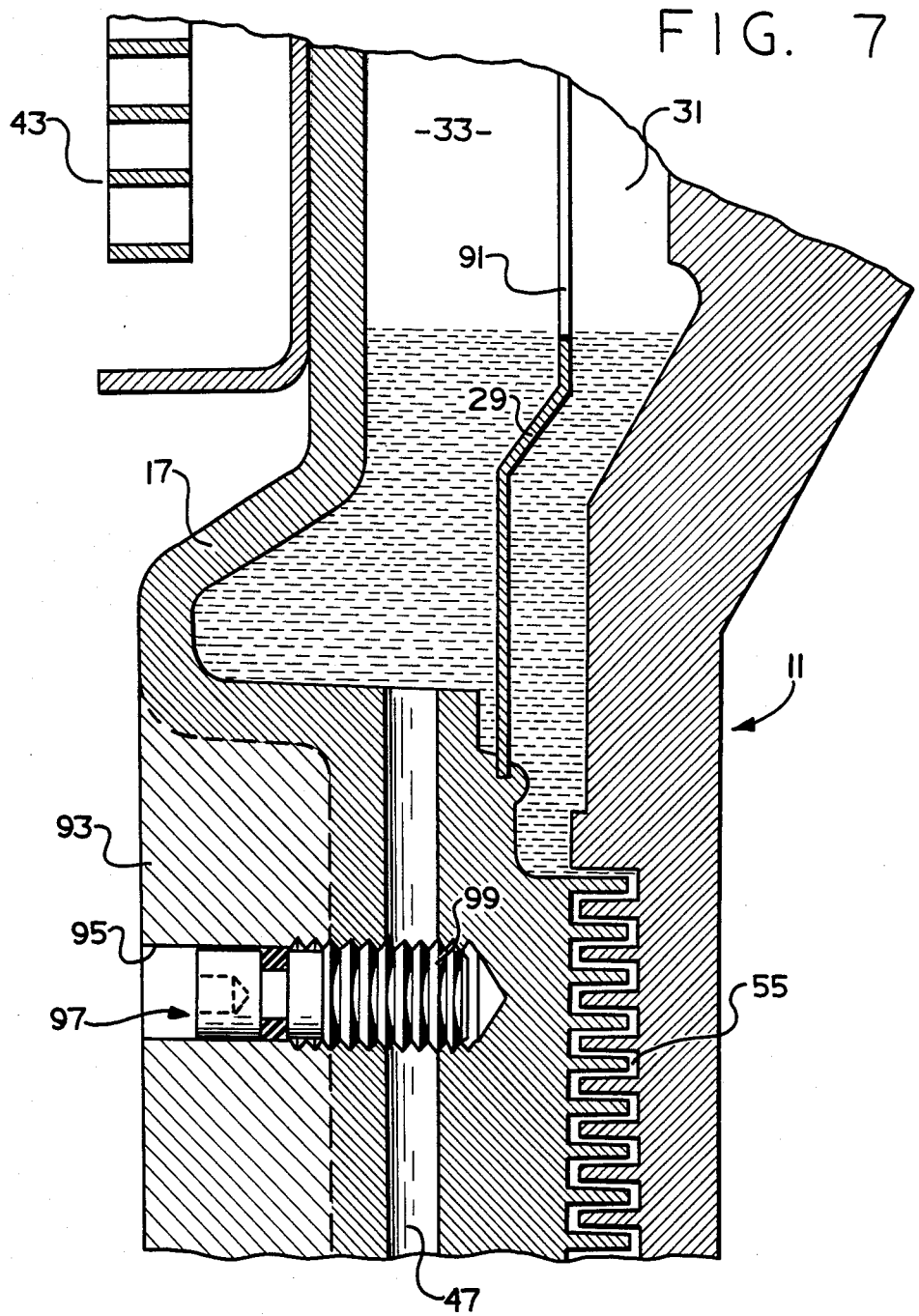
FIG. 7 is an enlarged, fragmentary axial cross-section of the lower half of a viscous fan drive made in accordance with an alternative embodiment of the present invention, illustrating the "fluid engaged" position of that embodiment.

Referring now to FIG. 7, there is illustrated an alternative embodiment of the present invention, in which like elements bear like numerals, and new elements bear numerals in excess of 90. In the embodiment of FIG. 7, unlike the embodiment of FIGS. 2 through 6, there are no "secondary fluid passages" provided for communicating fluid from the reservoir chamber 33 to the operating chamber 31. In the FIG. 7 embodiment, the valve plate 29 defines a greatly enlarged central opening 91 such that if the coupling device is at rest (as in FIG. 7), the fluid level in the reservoir chamber 33 will be "above" the bottom of the central opening 91, causing a substantial amount of fluid to flow from the reservoir chamber 33 into the operating chamber 31, substantially filling the shear space 55 as soon as the coupling device begins to rotate.

The cover member 17 defines a boss portion 93, which may be generally similar to the boss portion 59 of the FIG. 2 embodiment. The boss portion 93 and cover member 17 define a stepped, threaded bore 95. In the FIG. 7 embodiment, the bore 95 intersects the radial passage 47 through which fluid is pumped from the operating chamber 31 back into the reservoir chamber 33.

Disposed in the bore 95 is a manually operable control member 97, which includes a threaded portion 99 and a cylindrical portion 101. The control member 97 may be quite similar to the control member 65 of the FIG. 2 embodiment, except that the control member 97 does not define any fluid passages therethrough.

In the normal operation position of the FIG. 7 embodiment, the control member would be disposed such that the head of the control member 97 would be approximately flush with the front surface of the boss portion 93, and the threaded portion 99 would be disposed to permit normal discharge flow through the radial passage 47.

If an engine overheat occurs, or for some other reason it is desired to operate the coupling device in a "fluid engaged" position, the vehicle engine would be stopped for several minutes, such that the coupling device would be at rest and would have an opportunity for fluid to flow into the operating chamber 31, through the opening 91, in the manner described previously. While the engine is stopped, and the coupling device is at rest, the operator would then thread the control member 97 inwardly to the position shown in FIG. 7 blocking the radial passage 47. When the vehicle engine is again started, the fluid in the shear space 55 will result in torque transmission from the input coupling member 11 to the output coupling assembly 13, but because the control member 97 is now blocking the radial passage 47, the wiper 49 is unable to pump fluid out of the operating chamber 31 back into the reservoir chamber 33. Therefore, if the vehicle overheat were caused by improper calibration of the valve arm 39 and bimetal coil 43, such that the valve arm 39 would not uncover the fill opening 41 at the predetermined temperature, the manual control member 97 could be utilized to insure filling of the shear space 55 with fluid, and operation of the coupling device in the engaged condition.

For ease of illustration, the embodiment of FIG. 7 has been shown only in the fluid engaged position and has been described in terms of the normal operation and fluid engaged positions. However, it would be understood by those skilled in the art that the bore 95 could be extended, and the coupling member 11 provided with a recess similar to the recess 63 in the embodiment of FIGS. 2–6, such that the control member 97 could be threaded inwardly to a position corresponding to the mechanically engaged position illustrated in FIG. 5. It would also be understood by those skilled in the art that the central opening 91 could be replaced by a plurality of openings spaced circumferentially around the valve plate 29, as long as the openings are positioned such that, when the coupling device is at rest, enough fluid flows from the reservoir chamber 33 to the operating chamber 31 to substantially fill the shear space 55 once the coupling device begins to rotate.

FIG. 8

Figure 8:
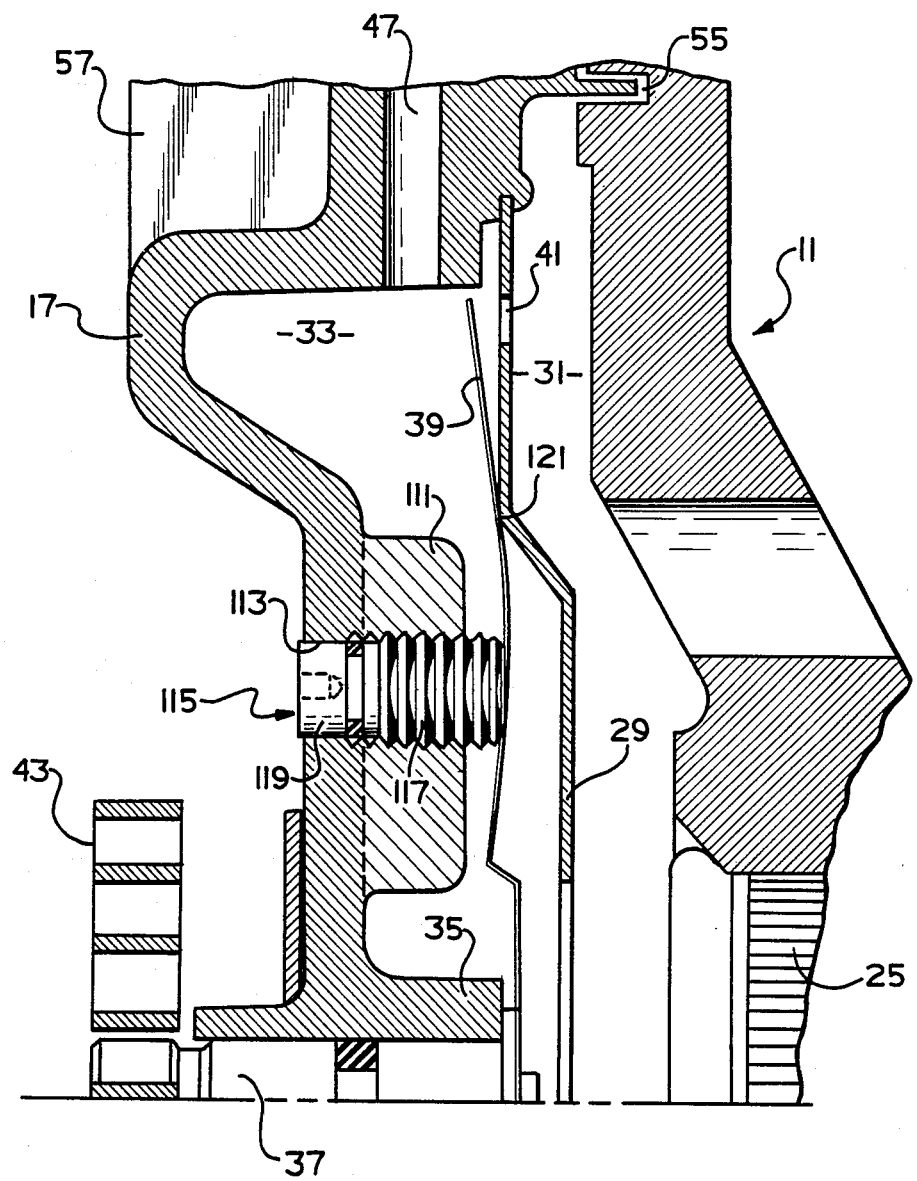
FIG. 8 is an enlarged, fragmentary axial cross-section of the upper half of a viscous fan drive made in accordance with yet another embodiment of the present invention, illustrating the "fluid engaged" position of that embodiment.

Referring now to FIG. 8, there is illustrated another alternative embodiment of the present invention in which like elements bear like numerals, and new or substantially modified elements bear numerals in excess of 110. The embodiment of FIG. 8 differs from the embodiments of FIGS. 2–6 and of FIG. 7 in that the manually operable control is not directly associated with a fluid passage (such as a "secondary" fill passage 79 in FIG. 4 or a "discharge" passage 47 in FIG. 7). Instead, the manual control in the FIG. 8 embodiment is operably associated with the primary control means (i.e., the valve arm 39) to control the flow of fluid in the "primary fluid passage means".

In the FIG. 8 embodiment, the cover member 17 includes a boss portion 111 disposed on the inside of the cover member 17, and circumferentially aligned with the valve arm 39. The boss portion 111 defines a stepped, threaded bore 113 and disposed therein is a manually operable control member 115. The control member 115 includes a threaded portion 117 and a cylindrical portion 119.

The control member 115 has a normal operation position in which the right end face of the member 115 would be approximately flush with the adjacent surface of the boss portion 111. FIG. 8 illustrates the fluid engaged position, in which of the manual control member 115 has been threaded inwardly to the position shown in FIG. 8 in which it engages the adjacent portion of the valve arm 39, moving that portion toward the right in FIG. 8. This rightward movement of that portion of the valve arm 39 causes the valve arm to pivot about a corner 121 of the stepped valve plate 29, the corner 121 acting as a fulcrum, causing the outer end of the valve arm 39 to move axially to the left in FIG. 8, uncovering the fill opening 41. Therefore, in the fluid engaged position of the manual control member 115, as shown in FIG. 8, the fill opening 41 is uncovered and the coupling device operates in the engaged mode, independently of the operation of the bimetal coil 43, and regardless of the current status of the temperature condition.

As in the case of the FIG. 7 embodiment, FIG. 8 does not illustrate a specific arrangement for a mechanically engaged position. However, those skilled in the art will understand from this specification that it would be possible to provide an elongated version of the manual control member 115, as well as suitable openings in the valve plate 29 and input coupling member 11. If a situation then arose requiring manual engagement, the valve arm 39 may be rotated, by manually turning the valve shaft 37, to a position in which the valve arm is no longer aligned with the control member 115. The control member 115 may then be threaded inwardly through the opening in the valve plate 29 to engage the input coupling member 11, thus providing the mechanically engaged position.

It is believed that upon a reading and understanding of the specification, various alterations and modifications of the invention will become apparent to those skilled in the art, and it is intended to include all such alterations and modifications as part of the invention, insofar as they come within the scope of the appended claims.

We claim:

1. A fluid coupling device of the type including a first rotatable coupling assembly comprising a housing member and a cover member cooperating to define a fluid chamber therebetween; means associated with said first coupling assembly and disposed to separate said fluid chamber into a fluid operating chamber and a fluid reservoir chamber; a second rotatable coupling member disposed in said fluid operating chamber and being rotatable relative to said first coupling assembly; said first coupling assembly and said second coupling member being operable to transmit torque therebetween in response to the presence of fluid in said operating chamber; fluid passage means disposed to communicate fluid between said fluid operating chamber and said fluid reservoir chamber; and primary control means operable to control the flow of fluid in said fluid passage means to provide operation of said fluid coupling device in one of an engaged mode and a disengaged mode, in response to changes in a predetermined condition, characterized by:
   (a) manually operable control means operably associated with one of said fluid passage means and said primary control means and including a control member selectively movable between:
      (i) a first position in which flow through said fluid passage means is controlled solely by said primary control means to provide normal operation of said fluid coupling device in one of said engaged mode and said disengaged mode as determined by said predetermined condition; and
      (ii) a second position insuring a net flow of fluid in said fluid passage means from said fluid reservoir chamber to said fluid operating chamber to provide operation of said fluid coupling device in said engaged mode, regardless of the status of said predetermined condition, and independent of the operation of said primary control means.

2. A fluid coupling device as claimed in claim 1 characterized by said fluid passage means including secondary fluid passage means disposed to communicate fluid from said fluid reservoir chamber into said fluid operating chamber independent of the operation of said primary control means.

3. A fluid coupling device as claimed in claim 2 characterized by said control member defining passage means and being selectively movable between said first position in which said control member blocks the flow of fluid through said secondary fluid passage means, and said second position in which said passage means is in series fluid communication with, and permits flow through said secondary fluid passage means to insure a flow of fluid from said reservoir chamber to said operating chamber.

4. A fluid coupling device as claimed in claim 3 characterized by said control member further being selectively movable to a third position in which said control member is in engagement with both said second coupling member and said first coupling assembly and is operable, in said third position, to limit relative rotation between said second coupling member and said first coupling assembly.

5. A fluid coupling device as claimed in claim 1 characterized by said cover member defining an axially-oriented opening, said control member being movably disposed in said opening, said opening intersecting secondary fluid passage means and together being disposed to communicate fluid from said fluid reservoir chamber into said fluid operating chamber independent of the operation of said primary control means.

6. A fluid coupling device as claimed in claim 5 characterized by said second coupling member defining a recess radially aligned with said axially-oriented opening, said control member being movable to a third position in which said control member is in engagement with both said opening and said recess to prevent relative rotation between said second coupling member and said first coupling assembly.

7. A fluid coupling device as claimed in claim 1 characterized by said fluid passage means including return passage means disposed to communicate fluid from said fluid operating chamber to said fluid reservoir chamber, said control member being movable between said first position in which said control member permits relatively unrestricted communication through said return passage means, and said second position in which said control member substantially restricts fluid communication through said return passage means to provide operation of said fluid coupling device in said engaged mode, independent of the operation of said primary control means.

8. A fluid coupling device as claimed in claim 7 characterized by said cover member defining an axially-oriented opening, said control member being movably disposed in said opening, said opening intersecting said return passage means.

9. A fluid coupling device as claimed in claim 1 characterized by said fluid passage means including a fill opening disposed to permit fluid communication from said reservoir chamber to said operating chamber, said primary control means including a valve member operably movable between one position permitting fluid flow through said fill opening and another position substantially blocking flow through said fill opening.

10. A fluid coupling device as claimed in claim 9 characterized by said control member being selectively movable between said first position in which said control member is out of engagement with said valve member whereby fluid flow through said fill opening is controlled solely by said primary control means, and a second position in which said control member moves said valve member to said one position permitting fluid flow through said fill opening independent of the operation of said primary control means.

11. A fluid coupling device of the type including a first rotatable coupling assembly comprising a housing member and a cover member cooperating to define a fluid chamber therebetween; partition means associated with said first coupling assembly and disposed to separate said fluid chamber into a fluid operating chamber and a fluid reservoir chamber; a second rotatable coupling member disposed in said fluid operating chamber and being rotatable relative to said first coupling assembly; said first coupling assembly and said second coupling member being operable to transmit torque therebetween in response to the presence of fluid in said fluid operating chamber; primary fluid passage means disposed to communicate fluid between said fluid operating chamber and said fluid reservoir chamber; and primary control means operable to control the flow of fluid in said primary fluid passage means, and the torque transmitted, in response to changes in a predetermined condition characterized by:

(a) secondary fluid passage means disposed to communicate fluid from said fluid reservoir chamber to said fluid operating chamber, said secondary fluid passage means being independent of said primary fluid passage means; and (b) manually operable control means operably associated with said secondary fluid passage means and including a control member selectively movable between:
 (i) a first position blocking the flow of fluid through said secondary fluid passage means to provide normal operation of said fluid coupling device; and
 (ii) a second position permitting the flow of fluid through said secondary fluid passage means to provide operation of said fluid coupling device in an engaged mode, regardless of the status of said predetermined condition, and independent of the operation of said primary control means.

* * * * *